(12) United States Patent
Hwang et al.

(10) Patent No.: US 8,977,064 B2
(45) Date of Patent: Mar. 10, 2015

(54) ROTATIONAL TRANSCODING FOR JPEG OR OTHER CODING STANDARDS

(75) Inventors: Hau Hwang, San Diego, CA (US); Hsiang-Tsun Li, San Diego, CA (US); Shizhong Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1223 days.

(21) Appl. No.: 12/030,826

(22) Filed: Feb. 13, 2008

(65) Prior Publication Data

US 2009/0202158 A1    Aug. 13, 2009

(51) Int. Cl.
| | |
|---|---|
| G06K 9/36 | (2006.01) |
| H04N 19/60 | (2014.01) |
| G06T 3/60 | (2006.01) |
| H04N 19/132 | (2014.01) |
| H04N 19/18 | (2014.01) |
| H04N 19/59 | (2014.01) |
| H04N 19/176 | (2014.01) |
| H04N 19/40 | (2014.01) |
| H04N 19/48 | (2014.01) |

(52) U.S. Cl.
CPC .......... *H04N 19/00775* (2013.01); *G06T 3/602* (2013.01); *H04N 19/00127* (2013.01); *H04N 19/00296* (2013.01); *H04N 19/00757* (2013.01); *H04N 19/00278* (2013.01); *H04N 19/00472* (2013.01); *H04N 19/00563* (2013.01)
USPC ............ 382/232; 382/233; 382/235; 382/248

(58) Field of Classification Search
CPC ............ G06T 3/602; H04N 19/00127; H04N 19/00278; H04N 19/00296; H04N 19/00472; H04N 19/00563; H04N 19/00757; H04N 19/00775; H04N 1/33307; H04N 1/41; H04N 2201/33357; H04N 2201/33378
USPC ......... 382/232, 233, 248, 235, 240, 247, 245; 375/240.11, 2, 40.19
See application file for complete search history.

(56) References Cited

U.S. PATENT DOCUMENTS

| | | | |
|---|---|---|---|
| 5,867,598 A * | 2/1999 | de Queiroz | 382/235 |
| 6,208,429 B1 * | 3/2001 | Anderson | 358/1.18 |
| 6,298,166 B1 | 10/2001 | Ratnakar et al. | |

(Continued)

FOREIGN PATENT DOCUMENTS

| | | | | |
|---|---|---|---|---|
| EP | 947954 A1 * | 10/1999 | ............... | G06T 3/00 |
| EP | 0947954 A1 | 10/1999 | | |

(Continued)

OTHER PUBLICATIONS

European Search Report—EP08006448, European Patent Office—Jul. 6, 2009.

(Continued)

*Primary Examiner* — Mekonen Bekele
(74) *Attorney, Agent, or Firm* — James R. Gambale, Jr.

(57) ABSTRACT

This disclosure describes techniques for rotating an encoded image, such as an image encoded according to a JPEG standard. In one example, a method for rotating an encoded image comprising reordering minimum coded units (MCUs) of the encoded image according to a specified rotation of the encoded image, rotating image data within the MCUs according to the specified rotation, and generating a rotated version of the encoded image comprising the reordered MCUs and the rotated image data within the MCUs.

43 Claims, 9 Drawing Sheets

(56) References Cited

U.S. PATENT DOCUMENTS

| | | | |
|---|---|---|---|
| 6,941,019 B1* | 9/2005 | Mitchell et al. | 382/232 |
| 7,146,053 B1* | 12/2006 | Rijavec et al. | 382/233 |
| 7,336,836 B2* | 2/2008 | Mitchell et al. | 382/233 |
| 7,643,689 B2* | 1/2010 | Yoshigahara et al. | 382/232 |
| 7,742,644 B2* | 6/2010 | Hwang et al. | 382/232 |
| 8,098,959 B2* | 1/2012 | Yeung et al. | 382/297 |
| 2002/0083204 A1* | 6/2002 | Jeong et al. | 709/247 |
| 2005/0053286 A1* | 3/2005 | Chuang et al. | 382/232 |
| 2005/0152608 A1 | 7/2005 | Niemi et al. | |
| 2006/0147122 A1* | 7/2006 | Srinidhi | 382/235 |
| 2006/0239566 A1 | 10/2006 | Yoshigahara et al. | |
| 2007/0165955 A1* | 7/2007 | Hwang et al. | 382/232 |
| 2007/0294245 A1* | 12/2007 | van Baarsen et al. | 707/6 |
| 2010/0104221 A1* | 4/2010 | Yeung et al. | 382/297 |

FOREIGN PATENT DOCUMENTS

| | | |
|---|---|---|
| JP | 9247423 A | 9/1997 |
| JP | 11331847 A | 11/1999 |
| JP | 2000333172 A | 11/2000 |
| JP | 2001223878 A | 8/2001 |
| JP | 2005228073 A | 8/2005 |
| JP | 2006277274 A | 10/2006 |
| JP | 2006303716 A | 11/2006 |
| JP | 2006303960 A | 11/2006 |
| JP | 2006352451 A | 12/2006 |
| JP | 2007324973 A | 12/2007 |

OTHER PUBLICATIONS

International Search Report and Written Opinion—PCT/US2009/034126, International Authority—European Patent Office—Jul. 6, 2009.

Viresh Ratnakar et al: "Fast dihedral symmetry operations on digital images in the compressed domain" Multimedia and Expo, 2000. ICME 2000. 2000 IEEE International Conference on New York, NY, USA July. 30-Aug. 2, 2000, Piscataway, NJ, USA,IEEE, US, vol. 1, Jul. 30, 2000, pp. 221-224, XP010511440 ISBN: 978-0-7803-6536-0.

Taiwan Search Report—TW098104728—TIPO—Jun. 20, 2012.

* cited by examiner

| 1 | 2 | 3 | 4 | 5 | 6 | 7 | 8 | 9 | 10 | 11 | 12 |
|---|---|---|---|---|---|---|---|---|---|---|---|
| 13 | 14 | 15 | 16 | 17 | 18 | 19 | 20 | 21 | 22 | 23 | 24 |
| 25 | 26 | 27 | 28 | 29 | 30 | 31 | 32 | 33 | 34 | 35 | 36 |
| 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 |
| 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 |
| 85 | 86 | 87 | 88 | 89 | 90 | 91 | 92 | 93 | 94 | 95 | 96 |

ROTATIONAL TRANSCODING FOR JPEG OR OTHER CODING STANDARDS

TECHNICAL FIELD

This disclosure relates to image processing, and more particularly, to techniques for rotating encoded images.

BACKGROUND

Digital cameras are commonly incorporated into a wide variety of devices. In this disclosure, a digital camera device refers to any device that can capture one or more digital images, including devices that can capture still images and devices that can capture sequences of images to record video. By way of example, digital camera devices may comprise stand-alone digital cameras or digital video camcorders, camera-equipped wireless communication device handsets such as mobile, cellular or satellite radio telephones, camera-equipped personal digital assistants (PDAs), computer devices that include cameras such as so-called "web-cams," or any devices with digital imaging or video capabilities.

JPEG is a commonly used method of compression for images. The name JPEG stands for Joint Photographic Experts Group, the name of the committee that created the standard. The JPEG encoding process includes several steps. First, the pixels of an image may be converted from red green and blue (RGB) to YCbCr, which includes one luma component (Y), representing brightness, and two chroma components (Cb and Cr), representing color.

Next, the resolution of the chroma data may be reduced, e.g., usually by a factor 2, to reflect the fact that the human eye is less sensitive to fine color details than to fine brightness details. Then, the image is split into blocks of 8×8 pixels, and for each block, each of the Y, Cb, and Cr data undergoes a discrete cosine transform (DCT). The amplitudes of the frequency components are then quantized. Since human vision is more sensitive to variations in color or brightness over large areas, than to the strength of high-frequency brightness variations, the magnitude of the high-frequency components may be stored with less accuracy than the low-frequency components. The quality setting of the encoder may be adjusted to control the extent of resolution for each frequency component. If an excessively low quality setting is used, the high-frequency components may be discarded altogether.

After the DCT process, the resulting data for all 8×8 blocks is further compressed, e.g., using differential coding techniques, and entropy coding techniques such as zig-zag scanning, Huffman coding, run-length coding, variable length coding (VLC) methodologies, application of coded block patterns (CBPs), or the like. The decoding process reverses the different JPEG coding steps to reproduce an array of pixel values that can be used to drive a display.

In many imaging applications, rotation of an image is desirable. For example, if an image is captured by a camera that is rotated 90 degrees, it may be desirable to rotate the image data so that the image is not rotated when the image is output on a display. Conventionally, an encoded JPEG image is rotated by decoding the image, rotating the decoded image in the pixel domain, and then re-encoding the rotated image. This conventional technique is very memory intensive because it requires temporary storage of one or more copies of an uncompressed image and storage of the compressed image before and after the rotation.

SUMMARY

This disclosure describes techniques for rotating an encoded image, such as an image encoded according to a JPEG standard. The encoded image may comprise a plurality of minimum coded units (MCUs). In one example, the MCUs may comprise blocks of discrete cosine transform (DCT) coefficients coded from 8 by 8 blocks of pixels via discrete cosine transformation. In accordance with this disclosure, an image is rotated without fully decoding the MCUs from the DCT domain to a pixel domain. In particular, the image may be rotated in the DCT domain, and this disclosure proposes processes that facilitate such rotation in the DCT domain. In some cases, differential decoding may be applied with respect to a low frequency (DC) component of each of the MCUs, but in this case the high frequency (AC) components of the MCUs remain in the DCT domain when the data is rotated.

According to this disclosure, first, the MCUs may be reordered so that the MCUs are positioned in a rotated order relative to the original encoded image. Then, the data within each of the MCUs may be rotated. In this way, a rotated version of the encoded image is generated without decoding all of the DCT coefficients back into a pixel format. Techniques for indexing the MCUs are also described, which can simplify the reordering of the MCUs. Furthermore, additional techniques are described, such as using the image rotation process as an opportunity to apply file size constraints to the encoded image. In this case, the original image may be coded without the file size constraints, and the rotated image may be coded with the file size constraints. In general, the image rotation process described herein may provide an opportunity to perform a number of additional coding steps, such as application of file size constraints.

In one example, this disclosure provides a method for rotating an encoded image comprising reordering MCUs of the encoded image according to a specified rotation of the encoded image, rotating image data within the MCUs according to the specified rotation, and generating a rotated version of the encoded image comprising the reordered MCUs and the rotated image data within the MCUs.

In another example, this disclosure provides an apparatus comprising memory that stores an encoded image, and a rotational transcoder that receives the encoded image from the memory, reorders MCUs of the encoded image according to a specified rotation of the encoded image, rotates image data within the MCUs according to the specified rotation, and generates a rotated version of the encoded image comprising the reordered MCUs and the rotated image data within the MCUs.

In another example, this disclosure provides a device comprising means for reordering MCUs of an encoded image according to a specified rotation of the encoded image, means for rotating image data within the MCUs according to the specified rotation, and means for generating a rotated version of the encoded image comprising the reordered MCUs and the rotated image data within the MCUs.

These and other techniques described herein may be implemented in hardware, software, firmware, or any combination thereof. If implemented in software, the software may be executed in a processor, such as a general purpose microprocessor, digital signal processor (DSP), application specific integrated circuit (ASIC), field programmable gate array (FPGA) or other type of processor. Such software may be initially stored in a computer-readable medium and loaded and executed in the processor to facilitate the rotation of an encoded image.

Accordingly, this disclosure also contemplates a computer-readable medium comprising instructions that upon execution cause a processor to reorder MCUs of an encoded image according to a specified rotation of the encoded image, rotate image data within the MCUs according to the specified rotation, and generate a rotated version of the encoded image comprising the reordered MCUs and the rotated image data within the MCUs.

The details of one or more embodiments are set forth in the accompanying drawings and the description below. Other features, objects, and advantages will be apparent from the description and drawings, and from the claims.

DETAILED DESCRIPTION

This disclosure describes techniques for rotating an encoded image. As an example, the encoded image may comprise an image encoded according to a Joint Photographic Experts Group (JPEG) standard, although the techniques of this disclosure may be applicable to other image compression standards. The techniques of this disclosure can be used to rotate still images, or encoded images that comprise frames of a video sequence. Rotation is often needed in digital camera devices where image data is generated in the same scan-line order regardless of whether the user orients the camera device in a landscape or a portrait orientation. For at least one of these orientations, a ninety (90) degree, one hundred eighty (180) degree, or two hundred seventy (270) degree rotation may be desired.

An encoded image may comprise a plurality of minimum coded units (MCUs). MCUs may comprise blocks of encoded data, such as blocks of data encoded via a discrete cosine transform (DCT) process. In this case, the MCUs may comprise blocks of DCT coefficients coded from blocks of pixels of an image. This disclosure provides techniques that facilitate image rotation without the need to decode such MCUs from the DCT domain back to the pixel domain. For example, the image may be rotated in the DCT domain, and this disclosure proposes effective processes that can facilitate such rotation. In some cases, if differential coding is used with respect to a low frequency (so called "DC") component of a given MCU, that differential coding on the DC component may be decoded. In this case, however, the AC coefficients are not decoded to the pixel domain, and image rotation occurs with the AC coefficients remaining in the DCT domain.

In accordance with this disclosure, the MCUs may be reordered according to a specified rotation so that the MCUs are positioned in a rotated order relative to the original encoded image. In order to facilitate this reordering of MCUs, this disclosure may make use of an indexing scheme. For example, in accordance with the JPEG standard, a restart marker value associated with an encoded image may be set to one. This may result in each DCT coded MCU forming an independently decodable unit of a JPEG image. Each MCU can be indexed, and the MCUs can be fetched in a reordered manner based on the indexing, so that the MCUs are positioned in a rotated order relative to the original encoded image. Then, the data within each of the MCUs is rotated according to the specified rotation. In this way, an encoded image that includes MCUs coded via DCT techniques can be rotated without decoding some or all of the DCT coefficients back to a pixel format. The described techniques can significantly reduce memory requirements associated with image rotation. Furthermore, additional techniques are disclosed herein, such as using the image rotation process as an opportunity to apply file size constraints to the encoded image. In this case, the original encoded image may be coded without file size constraints, and the rotated image may be coded with the file size constraints. The application of file size constraints may yield compression of the rotated image relative to the original encoded image.

Figure 1:
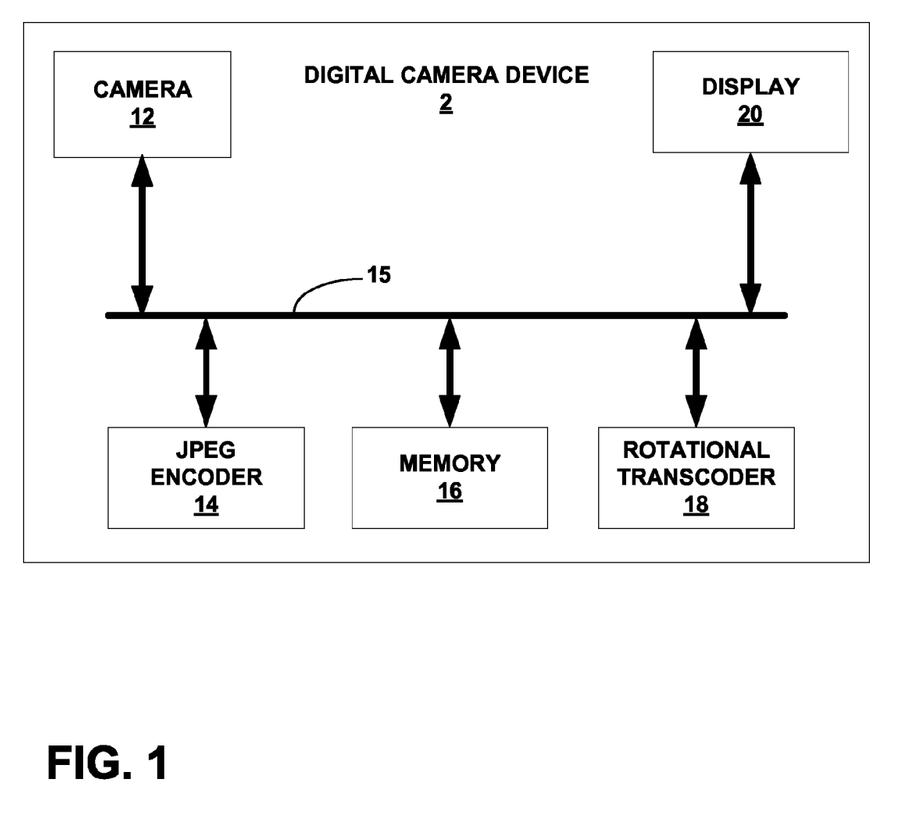
FIG. 1 a block diagram illustrating an exemplary imaging device capable of implementing the techniques of this disclosure.

FIG. 1 is a block diagram illustrating an exemplary digital camera device 2 that implements techniques of this disclosure. By way of example, digital camera device 2 may comprise a stand-alone digital camera, a digital video camcorder, a camera-equipped wireless communication device handset, such as a cellular or satellite radio telephone, a camera-equipped personal digital assistant (PDA), a computer device equipped with a digital camera, web-cam or the like, or any other device with imaging or video capabilities. The techniques of this disclosure are most applicable to wireless applications, such as in camera-equipped wireless communication device handsets, where memory is limited and power consumption is a concern.

As shown in FIG. 1, device 2 comprises a camera 12 that captures an image. The captured image may comprise a still photo, or an image frame of a video sequence. In the latter case, the techniques of this disclosure may be used successively for each image frame of the video sequence. JPEG coder 14 may comprise an encoder or a combined encoder-decoder (CODEC). JPEG coder 14 may encode the captured image in real time according to the JPEG compression standard. In this way, JPEG coder 14 generates an encoded image based on the captured image, wherein the encoded image is compressed according to the JPEG standard.

Memory 16 stores the encoded image. If desired, display 20 can display a decoded version of the image to a user. JPEG coder 14 may also facilitate decoding of the encoded image so that pixel data can be presented by display 20. Display 20 may comprise any type of display, such as a cathode ray tube (CRT), liquid crystal display (LCD), plasma display, or any display capable of presenting images to a user. In some examples, display 20 may comprise a viewfinder display of device 2. A data communication bus 15 facilitates data transfer between the different components of device 2. In some cases, however, camera 12 may be coupled to JPEG encoder 14 via a dedicated bus, and JPEG encoder 14 may perform so called "in-line" encoding as images are received. In this case, the rotational transcoding described herein may also be viewed as an in-line process that executes automatically anytime image rotation is needed. Such rotation may be determined to be needed based on user input or possibly based on the orientation of camera 12 during image capture.

Device 2 may also include many other components. For example, if device 2 is a wireless communication device, such as mobile telephone handset, device 2 may include various components such as an antenna, transmitter, receiver, and modulator to facilitate such wireless communications. These additional components, however, are omitted from FIG. 1 for simplicity and ease of illustration.

In accordance with this disclosure, device 2 includes a rotational transcoder 18, which facilitates image rotation in accordance with this disclosure. To do so, rotational transcoder 18 reorders MCUs of the encoded image and rotates image data within the MCUs such that the reordering of the MCUs and rotation of the image data generates a rotated version of the encoded image. After generating the rotated version of the encoded image, rotational transcoder 18 may output the rotated version of the encoded image to memory 16. The MCUs may comprise blocks of DCT coefficients coded according to a JPEG standard.

Rotational transcoder 18 may fetch the encoded image from memory 16, wherein the encoded image is coded via one or more entropy coding techniques. Rotational transcoder 18 entropy decodes the encoded image to generate the MCUs prior to reordering the MCUs, and entropy encodes the rotated version of the encoded image according to the one or more entropy coding techniques prior to outputting the rotated version of the encoded image. In this way, rotational transcoder 18 may perform a partial decode of the encoded image to remove entropy coding, but does not decode the DCT of the encoded image. Instead, rotational transcoder 18 rotates the encoded image substantially in the DCT domain, and then re-applies entropy coding to the rotated image. If differential coding is used on low frequency (DC) component of the DCT coefficients, rotational transcoder 18 may decode the DC component of the DCT coefficients so that differential coding can be removed. In this case, however, the AC components of the DCT coefficients associated with the given MCU may remain in the DCT domain for the image rotation process.

In some cases, in processing the reordered MCUs, rotational transcoder 18 may apply file size control parameters. In this case, the rotated version of the encoded image complies with the file size control parameters. For example, the rotated version of the encoded image may be compressed relative to the originally encoded image so as to comply with the file size control parameters. The application of file size control parameters typically requires a second coding process following an initial JPEG coding process. The techniques of this disclosure can provide a change to apply file size control parameters as part of the rotational transcoding. This can eliminate a separate coding process that would otherwise be needed to apply file size control parameters. Instead, this disclosure may use a single coding process (following an initial JPEG encoding process) to both perform rotation of an image and to apply file size control parameters to the image.

Rotational transcoder 18 may recorder the MCUs by assigning a restart marker value of 1 to the encoded image, indexing the MCUs based on the restart marker value, and reordering the MCUs based on the indexing. The restart marker value, according to JPEG, refers to a value designed to make JPEG files more resilient. By defining a restart marker value, sets of MCUs can be independently decoded, and therefore if errors occur in one set of MCUs, such errors will not propagate to other sets of MCUs. By assigning a restart marker value of 1 to the encoded image, each DCT coded MCU forms an independently decodable unit of a JPEG image. Each MCU can be indexed, and rotational transcoder 18 fetches the MCUs in a reordered manner based on the indexing, so that the MCUs are positioned in a rotated order relative to the original encoded image. Then, rotational transcoder 18 rotates data within each of the MCUs. A rotated version of the encoded image comprises the reordered MCUs with rotated data for each of the MCUs.

Rotational transcoder 18 may perform two or more operations in rotating image data within the MCUs. For example, rotational transcoder 18 may perform a vertical flip operation on coefficient values of the MCUs, and a transpose operation on the vertically flipped coefficient values of the MCUs. This can result in ninety (90) degree clockwise image rotation. In another example, rotational transcoder 18 may perform a vertical flip operation on coefficient values of the MCUs, and a horizontal flip operation on the vertically flipped coefficient values of the MCUs. This can result in a one hundred eighty (180) degree clockwise image rotation.

In another example, rotational transcoder 18 may perform a horizontal flip operation on coefficient values of the MCUs, and a vertical flip operation on the horizontally flipped coefficient values of the MCUs. This can result in one hundred eighty (180) degree counter clockwise image rotation. In another example, rotational transcoder 18 may perform a transpose operation on coefficient values of the MCUs, and a vertical flip operation on the transposed coefficient values of the MCUs. This can result in a two hundred seventy (270) degree clockwise image rotation. Rotational transcoder 18 may perform the desired amount of image rotation based on a specified level of rotation, which may be determined automatically based on image capture conditions associated with camera 12, or may be received from a user as input via an input unit (not shown) of device 2.

Figure 2:
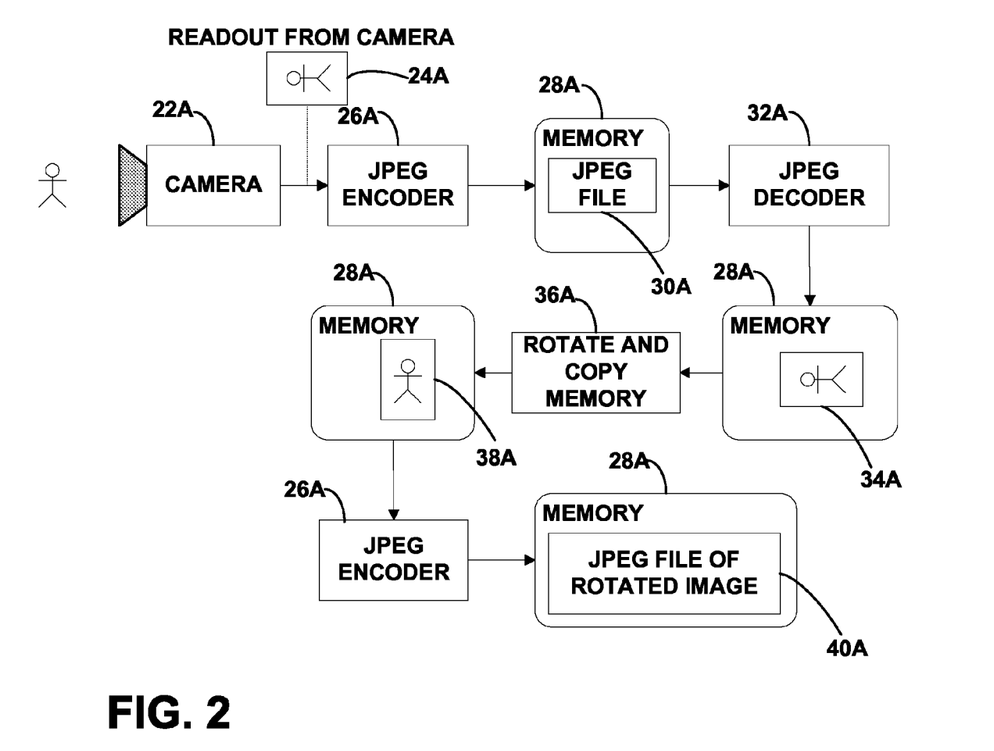
FIGS. 2 and 3 are block diagrams illustrating components that may be used to rotate an image.

FIG. 2 is a block diagram illustrating components that may be used to rotate an image. As shown in FIG. 2, a camera 22A captures an image, and readout 24A of camera 22A is provided to a JPEG encoder 26A that encodes the image according to the JPEG standard. A memory 28A stores the encoded JPEG file 30A of the image. A JPEG decoder 32A then decodes the JPEG file and stores a decoded file 34A in memory 28A. Rotate and copy unit 36A performs rotate and copy operations on decoded file 34A to generate a rotated version 38A of the decoded file, which is stored in memory 28A. JPEG encoder 26A then encodes the rotated version 38A of the decoded file and writes an encoded JPEG file of the rotated image 40A in memory 28A.

According to the process executed by the components of FIG. 2, an image is JPEG encoded, decoded, rotated, and then re-encoded. Unfortunately, the process executed by the components of FIG. 2 is very memory intensive. In particular, memory 28A is required to store JPEG file 30A, and two decoded versions 34A and 38A of the image. In addition, memory 28A also stores JPEG file 40A. Furthermore, the multiple encoding and decoding steps can add undesirable latency to the process of rotating an image. The techniques of this disclosure can reduce such memory requirements associated with image rotation according to the process executed by the components of FIG. 2, and can avoid the need to store uncompressed decoded versions of the image in pixel format.

Figure 3:
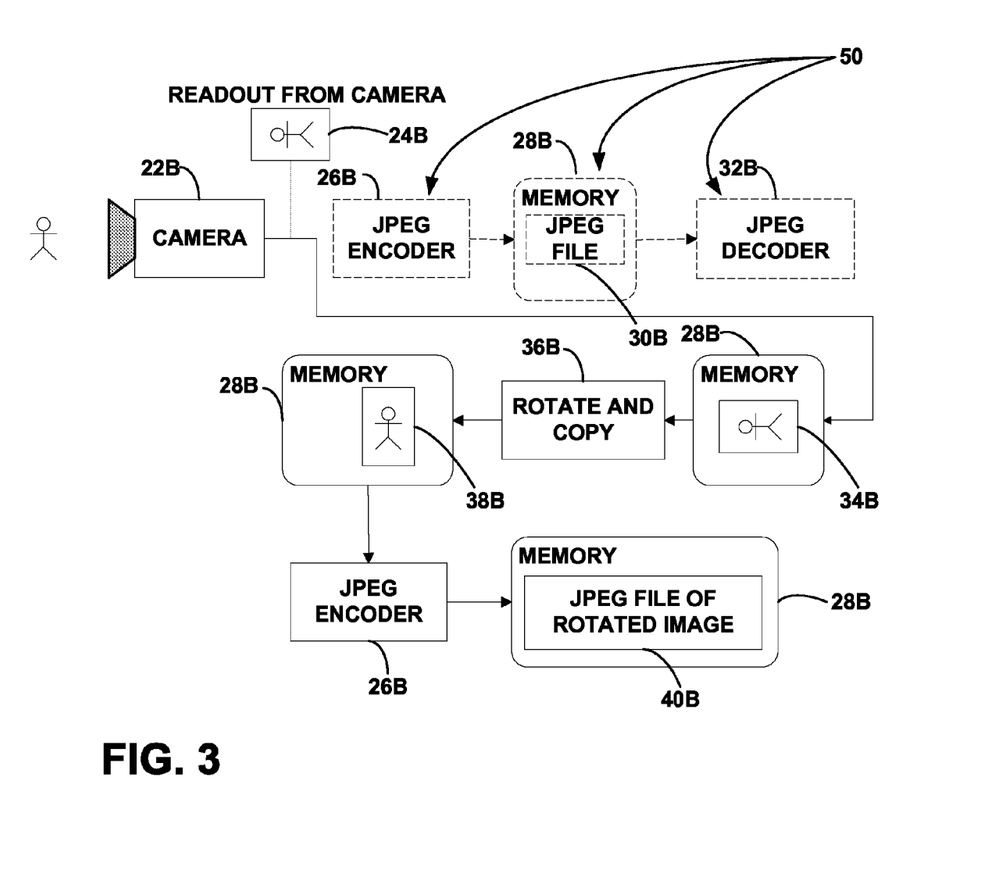

FIG. 3 is another block diagram illustrating components that may be used to rotate an image. As shown in FIG. 3, a camera 22B captures an image, and provides the readout 24B of camera 22B to a memory 28B without performing any JPEG encoding on file 34B. Rotate and copy unit 36B performs rotate and copy operations on file 34B to generate a rotated version 38B of the file, which is stored in memory 28B. JPEG encoder 26B then encodes the rotated version 38B of the decoded file and stores the encoded JPEG file of the rotated image 40B in memory 28B.

The process performed by the components of FIG. 3 is less memory intensive and less computationally intensive than the process executed by the components of FIG. 2. In particular, in the process performed by the components of FIG. 3, one JPEG encoding step 26B and one JPEG decoding step 32B are eliminated relative to the process executed by the components of FIG. 2. In addition, there is no need to store JPEG file 30B in memory 28B. Eliminated units of FIG. 3 relative to FIG. 2 are shown in dotted lines and labeled collectively as elements 50. Nevertheless, the process executed by the components of FIG. 3 is still very memory intensive, requiring storage of uncompressed versions 34B and 38B of the image file. The techniques of this disclosure can reduce memory requirements associated with image rotation relative to the processes executed by the respective components shown in FIGS. 2 and 3.

Figure 4:
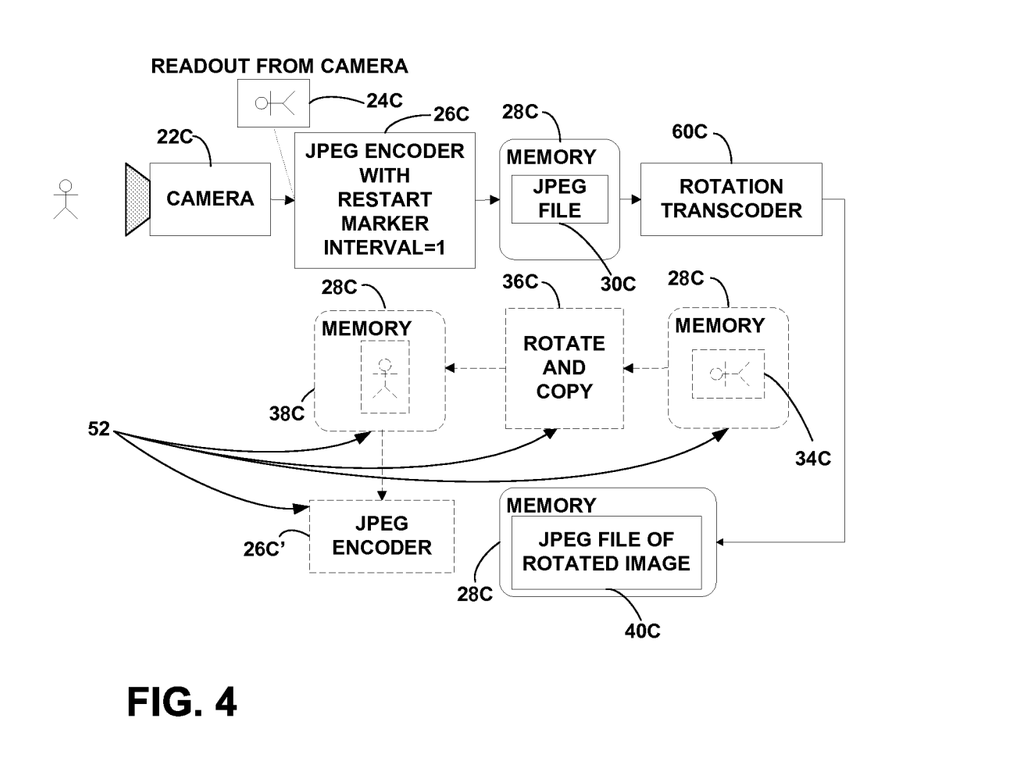
FIGS. 4 and 5 are block diagrams illustrating components that may be used to rotate an image consistent with the techniques of this disclosure.

FIG. 4 is a block diagram illustrating components that may be used to rotate an image in accordance with this disclosure. As shown in FIG. 3, a camera 22C captures an image, and readout 24C of camera 22C is provided to a JPEG encoder 26C. As shown, JPEG encoder 26C applies a restart marker interval of one. By setting the restart marker value to one, each MCU in encoded JPEG file 30C is a separately decodable unit. In this case, the entropy coding may only apply to a given MCU and may not extend between MCUs, as each MCU is itself independently decodable. Encoded JPEG file 30C is stored in memory 28C.

In accordance with this disclosure, rotational transcoder 60C performs rotational transcoding with respect to JPEG file 30C. In particular, rotational transcoder 60C reorders the MCUs of JPEG file 30C. Then, rotational transcoder 60C rotates image data within the MCUs. The reordering of MCUs and rotation of image data within the MCUs by rotational transcoder 60C generates a rotated version of the encoded image, which can be output to memory 28C and stored in memory as a JPEG file of a rotated image 40C.

Rotational transcoder 60C may fetch the encoded JPEG file 30C from memory 28C, wherein the encoded image is coded via one or more entropy coding techniques. Rotational transcoder 60C may entropy decode the encoded image to generate the MCUs prior to reordering and processing the MCUs, and entropy encode the rotated version of the encoded image according to the one or more entropy coding techniques prior to outputting the rotated version of the encoded image. In this way, rotational transcoder 60C may perform a partial decode of the encoded image to remove entropy coding, but does not fully decode the DCT coded information of the encoded image. Instead, rotational transcoder 60C rotates the encoded image substantially in the DCT domain, and then re-applies entropy coding to the rotated image. In some cases, if differential coding is used on the low frequency (DC) component of the DCT coefficients, rotation transcoder 60C may decode the DC component of the DCT coefficients so to remove such differential coding. In this case, however, the AC components of the DCT coefficients may remain in the DCT domain.

The process executed by the components of FIG. 4 is much less memory intensive than the processes executed by the components of FIGS. 2 and 3. In the process executed by the components of FIG. 4, the need to store decoded versions 34C and 38C of the image in memory 28C can be eliminated and rotate and copy unit 36C is replaced by the rotational transcoder 60C. The additional step associated with JPEG encoder 26C' can also be eliminated. The eliminated units of FIG. 4 relative to those of FIG. 2 are shown in dotted lines, and are labeled collectively as elements 52.

Figure 5:
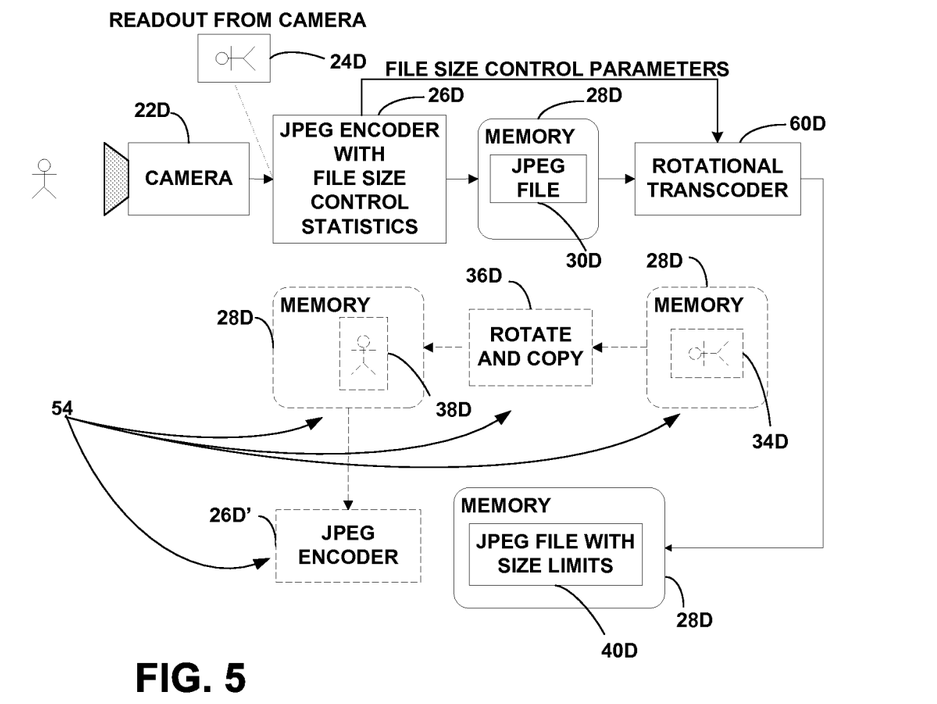

FIG. 5 is another block diagram illustrating a process for rotating an image in accordance with this disclosure. As shown in FIG. 5, a camera 22D captures an image, and readout 24D of camera 22D is provided to a JPEG encoder 26D. Like in FIG. 4, JPEG encoder 26D of FIG. 5 applies a restart marker interval of one. Again, by setting the restart marker value to one, each MCU in encoded JPEG file 30D is a separately decodable unit. Encoded JPEG file 30D is stored in memory 28D. In FIG. 5, JPEG encoder 26D generates file size control parameters and forwards these file size control parameters for application by rotational transcoder 60D. The file size control parameters may comprise one or more parameters that can be used to limit the size of the encoded JPEG file. Such parameters may result in the reduction or elimination of high frequency AC components of the DCT coefficients in order to compress the data. In general, the image rotation process described herein may provide an opportunity to perform a number of additional coding steps, such as application of file size control parameters, or other types of parameters.

Rotational transcoder 60D performs rotational transcoding with respect to JPEG file 30D. Furthermore, in the example of FIG. 5, rotational transcoder 60D applies the file size control parameters so that the rotated version of the JPEG file (file 40D) is encoded with size limits and/or constraints. Again, in the rotational transcoding, rotational transcoder 60D reorders the MCUs of JPEG file 30D, and rotates image data within the MCUs. The reordering of MCUs and rotation of image data within the MCUs may be based on a specified level rotation, e.g., received as user input or generated automatically based on the orientation of camera 22D. During the rotational transcoding, the file size parameters can be applied by rotational transcoder 60D to ensure that the encoded JPEG file 40D falls within specified size limits. Again, such parameters may cause rotational transcoder 60D to reduce or eliminate one or more high frequency AC components of the DCT coefficients in order to compress the data under the file size constraints specified by the parameters. The rotated version of the encoded image is output to memory 28D and stored in memory as a JPEG file of a rotated image with size limits 40D.

As outlined above, rotational transcoder 60D may fetch the encoded JPEG file 30D from memory 28D, wherein the encoded image is coded via one or more entropy coding techniques. Rotational transcoder 60D may include entropy decoding components to entropy decode the encoded image to generate the MCUs prior to reordering the MCUs. In addition, rotational transcoder 60D may include entropy encoding components to entropy encode the rotated version of the encoded image according to the one or more entropy coding techniques, e.g., prior to outputting the rotated version of the encoded image. In this way, rotational transcoder 60D may perform a partial decode of the encoded image to remove entropy coding, but does not decode the DCT of the encoded image. Instead, rotational transcoder 60D rotates the encoded image substantially in the DCT domain, and then re-applies any entropy coding to the rotated image. In some case, however, if differential coding is used on the low frequency (DC) coefficient of the DCT coefficients, rotation transcoder 60D may decode the DC coefficient so that such differential coding can removed. In this case, the high frequency (AC) coefficients of the DCT coefficients may remain in the DCT domain.

The application of file size parameters may reduce or eliminate so-called high frequency DCT coefficient values within the MCUs. The high frequency values are sometimes called AC values, in contrast to the low frequency "DC" value that represents average intensity of the entire MCU. According to FIG. 5, rotational transcoder 60D not only rotates the image, but may also be used to apply file size parameters in order to generate a JPEG file 40D that has size limits mandated by the file size parameters. In general, the image rotation process described herein may provide an opportunity to perform a number of additional coding steps, such as application of file size control parameters, or other types of parameters that may be conventionally applied via a second coding pass following an initial JPEG encoding pass.

Like the process executed by the components of FIG. 4, the process executed by the components of FIG. 5 is much less memory intensive than the processes executed by the components of FIGS. 2 and 3. In the process executed by the components of FIG. 5, the need to store decoded versions 34D and 38D of the image in memory 28D can be avoided, and rotate and copy unit 36D may be replaced by the rotational transcoder 60D. The additional step performed by JPEG encoder 26D' can also be eliminated. The eliminated components of FIG. 5 relative to those of FIG. 2 are shown in dotted lines, and are labeled collectively as elements 54.

Figure 6:
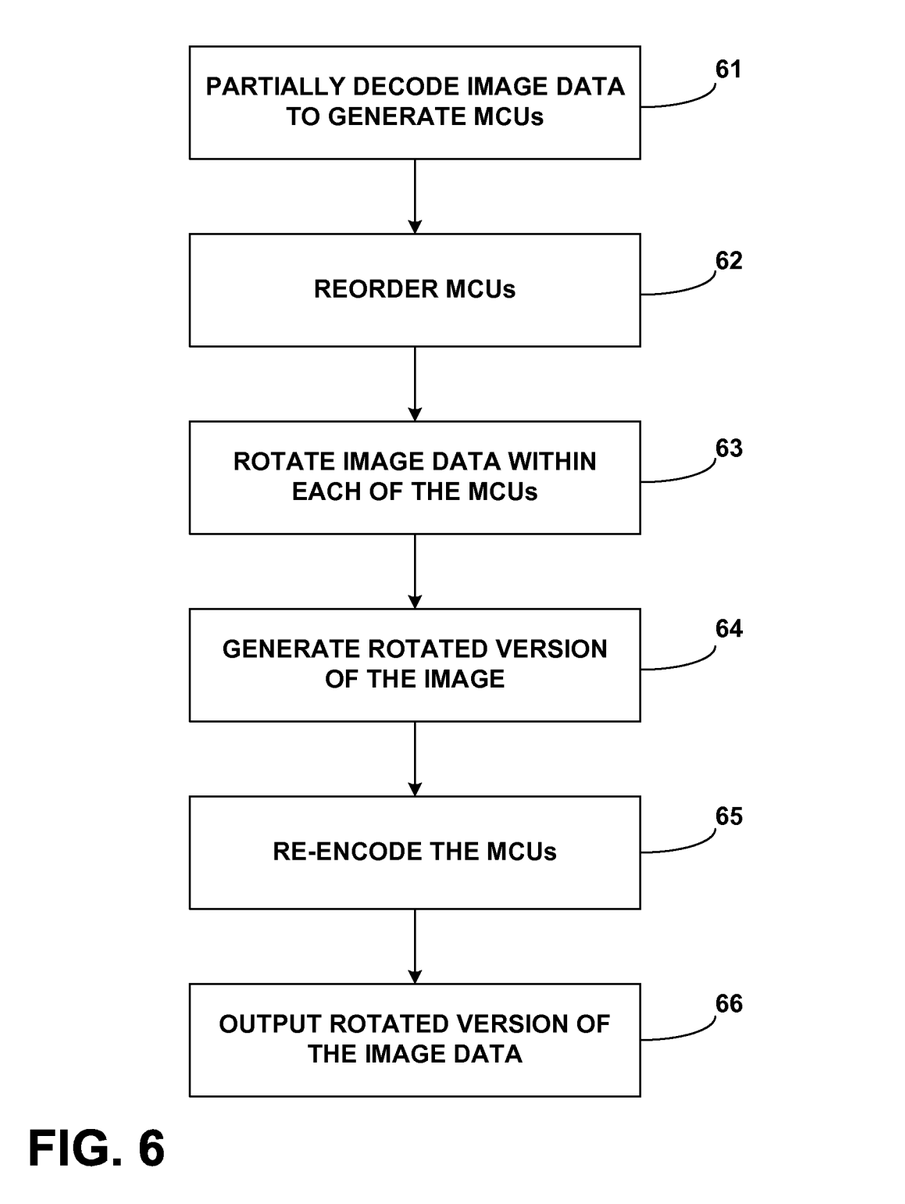
FIGS. 6 and 7 are flow diagrams illustrating techniques for rotating an image consistent with this disclosure.

FIG. 6 is a flow diagram illustrating a technique consistent with this disclosure. FIG. 6 will be described from the perspective of device 2 of FIG. 1. As shown in FIG. 6, rotational transcoder 18 of device 2 partially decodes image data associated with an encoded file to generate MCUs (61). As an example, the encoded file may comprise a JPEG file that includes both DCT encoding and entropy encoding. The partial decoding process (61) may include entropy decoding but does not fully decode the DCT coefficients back to a pixel domain.

Rotational transcoder 18 reorders the MCUs (62). For example, the MCUs may be reordered such that the MCUs are presented in a rotated manner relative to the original image. Next, rotational transcoder 18 processes the image data within each of the MCUs in order to rotate the image data within each of the MCUs (63). Thus, rotational transcoder first reorders the MCUs (62), and then rotates the image data within each of the MCUs (63). The steps of (62) and (63) results in the generation of a rotated version of the image. That is to say, rotational transcoder 18 generates a rotated version of the image comprising the reordered MCUs and the rotated image data within the MCUs (64). The steps of (62) and (63), however, could be reversed in some embodiments.

After generating the rotated version of the image comprising the reordered MCUs and the rotated image data within the MCUs (64), rotational transcoder 18 re-encodes the MCUs (65). This re-encoding process of step (65) is the opposite of the partial decode process of step (61). Thus, in the example where step (61) involves entropy decoding, step (65) may involve entropy encoding the MCUs. Rotational transcoder 18 then outputs a rotated version of the image data, e.g., a rotated JPEG file, to memory 16 (66).

Figure 7:
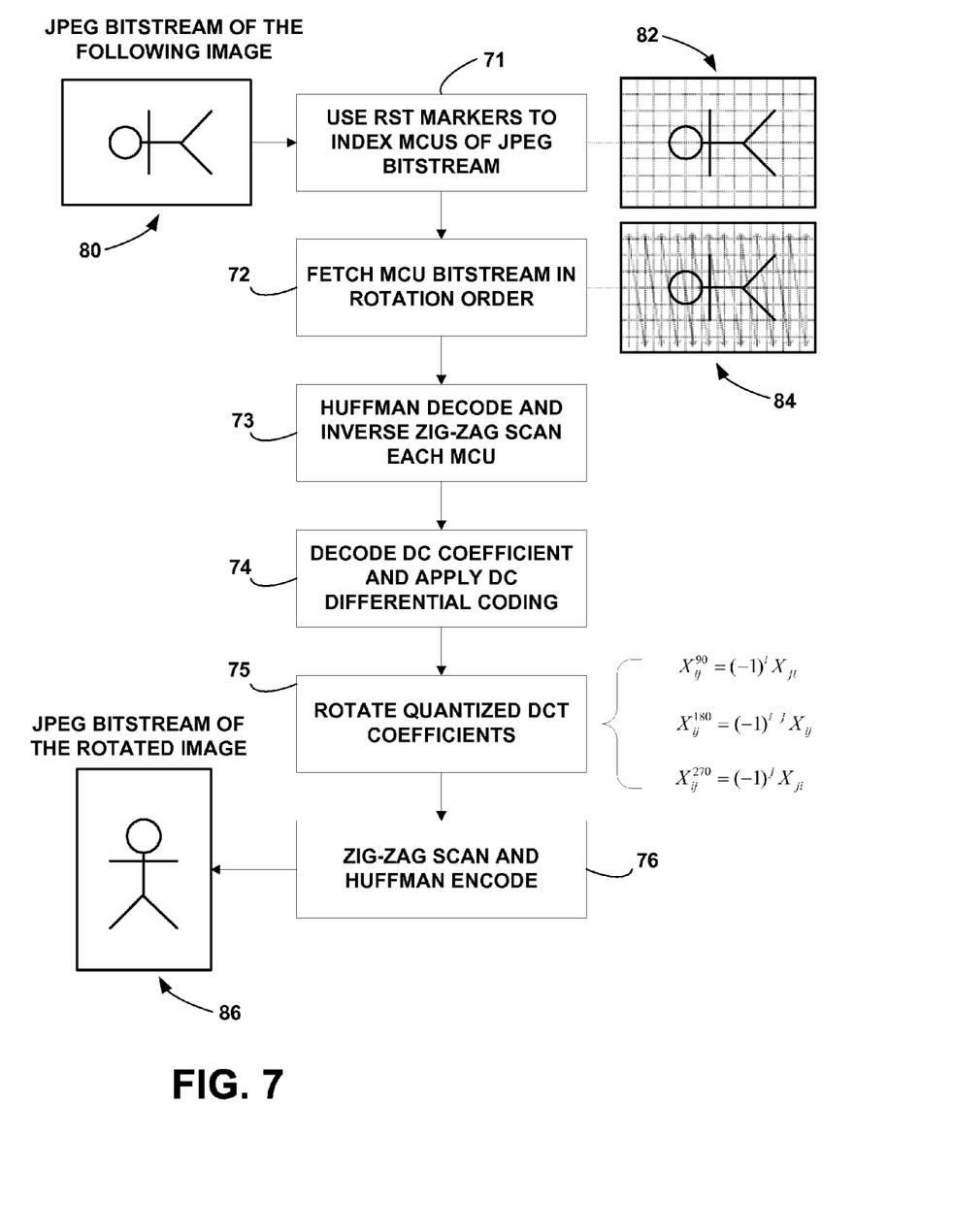

FIG. 7 is another flow diagram illustrating an exemplary rotational transcoding process consistent with this disclosure. FIG. 7 will be described from the perspective of exemplary device 2 of FIG. 1. As shown in FIG. 7, memory 16 of device 2 may originally store a JPEG bitstream of an image 80, which may have been encoded by JPEG encoder 14. Rotational transcoder 18 uses restart (RST) markers to index MCUs of the JPEG bitstream (71). In particular, by selecting a restart marker value of 1, each of the MCUs may comprise a separately decodable unit. Image 82 illustrates an example of an image separated into MCUs with restart markers of 1.

Next, rotational transcoder 18 fetches the MCU bitstream in a rotational order (72). This reorders the MCUs. For example, as shown in image 84, the MCUs can be fetched in an order that results in rotation of the MCUs relative to those of image 82. For example, for 90 degree rotation, the first MCU fetched may be the MCU in the lower left hand corner of image 84, and the last MCU fetched may be the MCU in the upper right hand corner of image 84. The MCUs may be fetched in the order shown in by the arrows illustrated within image 84.

Rotational transcoder 18 Huffman decodes and inverse zig-zag scans each of the MCUs (73). This process of Huffman decoding and inverse zig-zag scanning may be referred to herein as entropy decoding. Next, rotational transcoder 18 may decode only the DC coefficient of each MCU and apply DC differential decoding to each MCU (74). The DC differential decoding of step 74 may remove any differential coding that was applied to the DC coefficient of the DCT coefficients. To do so may require at least a partial decode of the DC coefficient of each MCU, but in this case, the AC coefficients remain coded in the DCT domain.

Rotational transcoder 18 rotates the quantized DCT coefficients (75). In the example of MCU fetching shown in image 84, this rotation may be 90 degree rotation. However, 180 degree rotation or 270 degree rotation may also be performed. Exemplary matrix transformation equations that can be applied to the MCUs for 90, 180 or 270 degree rotation are listed next to step (75) in FIG. 7. In particular, 90 degree rotation may be achieved by applying:

$$X_{ij}^{90}=(-1)^{i}X_{ji}$$

180 degree rotation may be achieved by applying:

$$X_{ij}^{180}=(-1)^{i+j}X_{ij}$$

270 degree rotation may be achieved by applying:

$$X_{ij}^{270}=(-1)^{j}X_{ji}$$

Once the coefficients of the MCUs are rotated, rotational transcoder 18 zig-zag scans and Huffman encodes the MCUs (76). This process of zig-zag scanning and Huffman encoding may be referred to herein as entropy encoding. Rotational transcoder 18 may output a JPEG bitstream of the rotated image 86 to memory 16.

In order to rotate the DCT coefficients of each of the MCUs (following the reordering of the MCUs), rotational transcoder 18 may perform one or more of the following computations. For example, let $$X=CxC^T$$

where C is the DCT kernel, x represents a matrix of pixel values and X represents a matrix of DCT values. Examples of C and x are shown below:

$$C = \begin{bmatrix} c_{00} & c_{00} & c_{00} & c_{00} & c_{00} & c_{00} & c_{00} & c_{00} \\ c_{10} & c_{11} & c_{12} & c_{13} & -c_{13} & -c_{12} & -c_{11} & -c_{10} \\ c_{20} & c_{21} & -c_{21} & -c_{20} & -c_{20} & -c_{21} & c_{21} & c_{20} \\ c_{30} & c_{31} & c_{32} & c_{33} & -c_{33} & -c_{32} & -c_{31} & -c_{30} \\ c_{40} & c_{41} & c_{41} & c_{40} & c_{40} & c_{41} & c_{41} & c_{40} \\ c_{50} & c_{51} & c_{52} & c_{53} & -c_{53} & -c_{52} & -c_{51} & -c_{50} \\ c_{60} & c_{61} & -c_{61} & -c_{60} & -c_{60} & -c_{61} & c_{61} & c_{60} \\ c_{70} & c_{71} & c_{72} & c_{73} & -c_{73} & -c_{72} & -c_{71} & -c_{70} \end{bmatrix}$$

$$x = \begin{bmatrix} x_{00} & x_{01} & x_{02} & x_{03} & x_{04} & x_{05} & x_{06} & x_{07} \\ x_{10} & x_{11} & x_{12} & x_{13} & x_{14} & x_{15} & x_{16} & x_{17} \\ x_{20} & x_{21} & x_{22} & x_{23} & x_{24} & x_{25} & x_{26} & x_{27} \\ x_{30} & x_{31} & x_{32} & x_{33} & x_{34} & x_{35} & x_{36} & x_{37} \\ x_{40} & x_{41} & x_{42} & x_{43} & x_{44} & x_{45} & x_{46} & x_{47} \\ x_{50} & x_{51} & x_{52} & x_{53} & x_{54} & x_{55} & x_{56} & x_{57} \\ x_{60} & x_{61} & x_{62} & x_{63} & x_{64} & x_{65} & x_{66} & x_{67} \\ x_{70} & x_{71} & x_{72} & x_{73} & x_{74} & x_{75} & x_{76} & x_{77} \end{bmatrix}$$

If pixel matrix (x) is transposed in the pixel domain, the corresponding DCT matrix (X) is transposed according to the following operation:

$$X^T=(CxC^T)^T=Cx^TC^T$$

A spatial domain vertical flip operation may be given as follows:

$$x = \begin{bmatrix} x_{00} & x_{01} & x_{02} & x_{03} & x_{04} & x_{05} & x_{06} & x_{07} \\ x_{10} & x_{11} & x_{12} & x_{13} & x_{14} & x_{15} & x_{16} & x_{17} \\ x_{20} & x_{21} & x_{22} & x_{23} & x_{24} & x_{25} & x_{26} & x_{27} \\ x_{30} & x_{31} & x_{32} & x_{33} & x_{34} & x_{35} & x_{36} & x_{37} \\ x_{40} & x_{41} & x_{42} & x_{43} & x_{44} & x_{45} & x_{46} & x_{47} \\ x_{50} & x_{51} & x_{52} & x_{53} & x_{54} & x_{55} & x_{56} & x_{57} \\ x_{60} & x_{61} & x_{62} & x_{63} & x_{64} & x_{65} & x_{66} & x_{67} \\ x_{70} & x_{71} & x_{72} & x_{73} & x_{74} & x_{75} & x_{76} & x_{77} \end{bmatrix}$$

$$\tilde{x} = \begin{bmatrix} x_{70} & x_{71} & x_{72} & x_{73} & x_{74} & x_{75} & x_{76} & x_{77} \\ x_{60} & x_{61} & x_{62} & x_{63} & x_{64} & x_{65} & x_{66} & x_{67} \\ x_{50} & x_{51} & x_{52} & x_{53} & x_{54} & x_{55} & x_{56} & x_{57} \\ x_{40} & x_{41} & x_{42} & x_{43} & x_{44} & x_{45} & x_{46} & x_{47} \\ x_{30} & x_{31} & x_{32} & x_{33} & x_{34} & x_{35} & x_{36} & x_{37} \\ x_{20} & x_{21} & x_{22} & x_{23} & x_{24} & x_{25} & x_{26} & x_{27} \\ x_{10} & x_{11} & x_{12} & x_{13} & x_{14} & x_{15} & x_{16} & x_{17} \\ x_{00} & x_{01} & x_{02} & x_{03} & x_{04} & x_{05} & x_{06} & x_{07} \end{bmatrix},$$

where $x$ represents an original matrix of pixel values of an MCU and $\tilde{x}$ represents a matrix that is vertically flipped.

The equivalent operation for a vertical flip operation in the DCT domain may be given by:

$$\tilde{X}_{ij} = (-1)^i X_{ij}$$

Similarly, an operation for a horizontal flip operation in the DCT domain may be given by:

$$\hat{X}_{ij} = (-1)^j X_{ij}$$

In the spatial domain, a 90 degree clockwise rotation may be divided into two operations: a vertical flip operation followed by a transpose operation. A transpose operation refers to a matrix operation T where the any matrix A has the property $(A^T)^T = A$. The DCT operations for a 90 degree rotation in the DCT domain may be given a combination of vertical flip followed by transpose, which may be collectively represented by:

$$X_{ij}^{90} = \tilde{X}^T = (-1)^i X_{ji}$$

180 degree clockwise rotation may also be divided into two operations: a vertical flip and a horizontal flip. Therefore, the DCT operations for a 180 degree rotation in the DCT domain may be given by:

$$X_{ij}^{180} = (-1)^{i+j} X_{ij}$$

270 degree clockwise rotation may also be divided into two operations: a transpose followed by a vertical flip. Therefore, the DCT operations for a 270 degree rotation in the DCT domain may be given by:

$$X_{ij}^{270} = (-1)^j X_{ji}$$

In some cases, image rotation in the DCT domain could be embedded or combined with DCT quantization and zig-zag scan operations. Based on the desired rotation, signs of the quantization parameters could be changed accordingly, as set forth by the equations above. Similarly, if a transpose operation is needed, the transpose operation could be combined with DCT transform operations or combined into a zig-zag scan table applied during the rotational transcoding. Accordingly, the rotational operations performed by rotational transcoder 18 need not be applied as separate operations, but could be combined with the entropy decoding or entropy encoding steps discussed herein.

Figure 8:
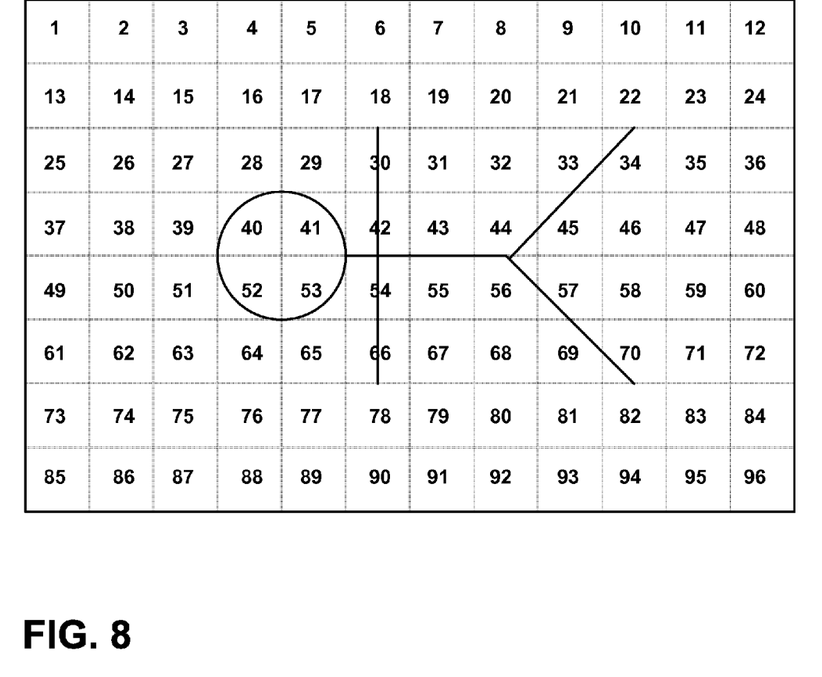
FIG. 8 is a conceptual diagram showing an image that is indexed according to MCUs.

FIG. 8 is a conceptual diagram showing an image that is indexed according to MCUs. In particular, by assigning a restart marker value of a JPEG file to 1, each MCU of the JPEG file may comprise a separately decodable unit. This means that any entropy coding may need to be performed within each MCU, and entropy coding does not extend between the MCUs. Furthermore, each MCU may be automatically indexed in a raster order as shown in FIG. 8. Once this indexing is performed, rotational transcoder 18 (FIG. 1) can fetch MCUs from memory 16 according to a specified rotation. For example, for 90 degree rotation, rotational transcoder 18 may fetch MCUs in the following order according to the index numbers shown in FIG. 7 (85, 73, 61, 49, 37, 25, 13, 1, 86, 74, 62, and so forth). For 180 degree rotation, rotational transcoder 18 may fetch MCUs in a reverse order (96, 95, 94, 93, 92, 91, 90, 89, 88, 87, 86, 85, 84, 83, and so forth). For 270 degree rotation, rotational transcoder 18 may fetch MCUs in the following order according to the index numbers shown in FIG. 7 (12, 24, 36, 48, 60, 72, 84, 96, 11, 23, 35, and so forth). In this way, indexing facilitates memory fetches to process data in a manner that allows for image rotation. Upon fetching a given MCU, the data within that MCU is then rotated as addressed herein. The reordering and rotation of data within the reordered MCUs collectively generates a rotated version of the image, e.g., without requiring the MCUs to be fully decoded back to the pixel domain.

Figure 9:
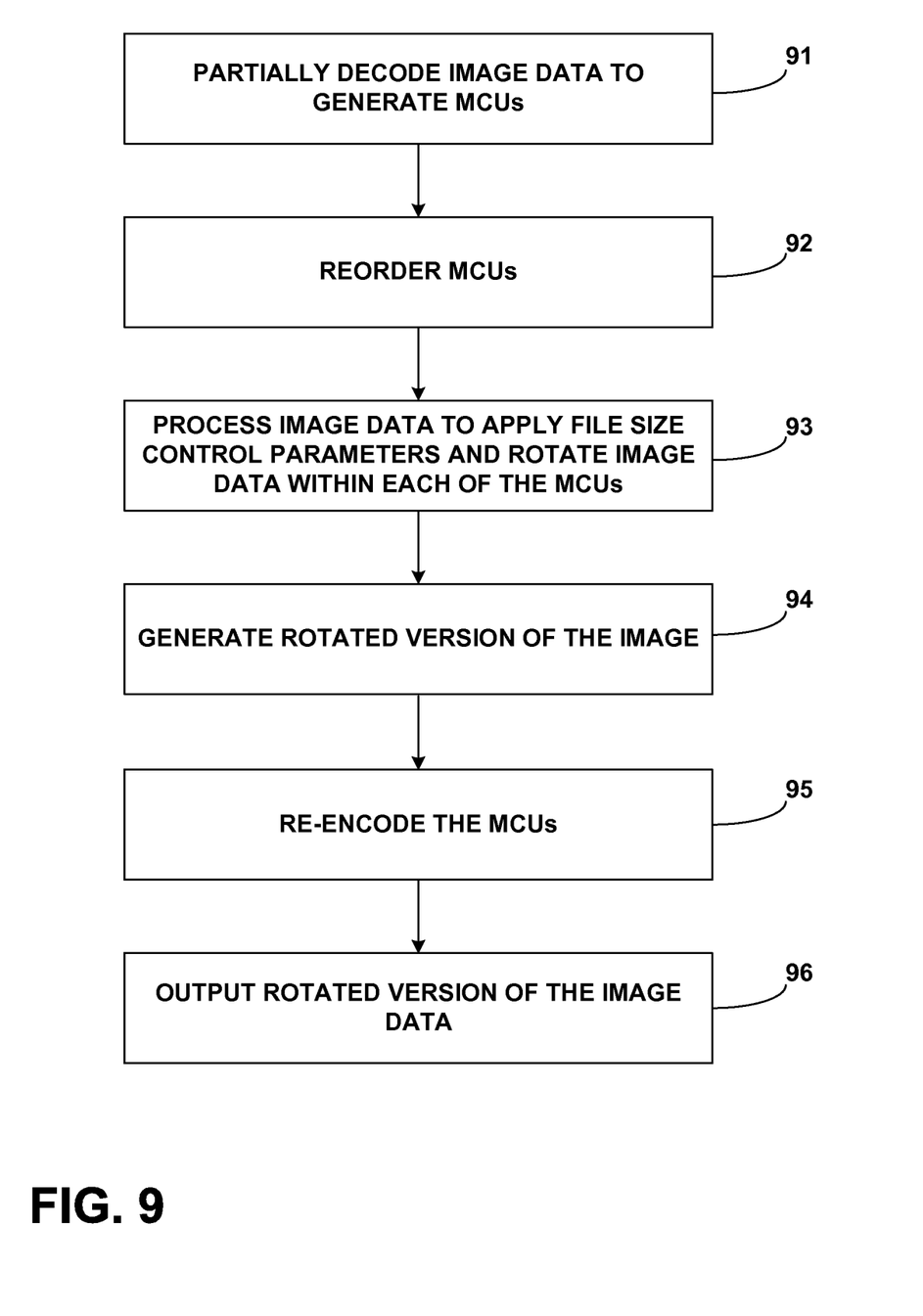
FIG. 9 is another flow diagram illustrating a technique for rotating an image consistent with this disclosure.

FIG. 9 is another flow diagram illustrating a technique for rotating an image consistent with this disclosure. FIG. 9 will be described from the perspective of device 2 of FIG. 1. As shown in FIG. 9, rotational transcoder 18 of device 2 partially decodes image data associated with an encoded file to generate MCUs (91). As an example, the encoded file may comprise a JPEG file that includes both DCT encoding and entropy encoding. The partial decoding process (91) may include entropy decoding but does not fully decode the DCT coefficients back to a pixel domain. As noted, in some cases the low frequency DC coefficient may be decoded to remove differential coding, while the high frequency AC coefficients remain in the DCT domain.

Rotational transcoder 18 reorders the MCUs (92). For example, the MCUs may be reordered such that the MCUs are presented in a rotated manner relative to the original image. Next, rotational transcoder 18 processes the image data within each of the MCUs in order to apply file size parameters and to rotate the image data within each of the MCUs (93). Thus, rotational transcoder first reorders the MCUs (92), and then rotates the image data within each of the MCUs (93). The steps of (92) and (93) results in the generation of a rotated version of the image that complies with file size constraints. That is to say, rotational transcoder 18 generates a rotated (possibly compressed) version of the image comprising the reordered MCUs and the rotated image data within the MCUs (94). The rotated image data may be compressed based on the file size constraints. For example, the file size parameters may specify file size limits, and rotational transcoder 18 may compress data (e.g., by reducing or eliminating values associated with high frequency DCT components) so that the rotated image does not exceed the file size constraints. The steps of (92) and (93) could be reversed in some embodiments.

After generating the rotated (and possibly compressed) version of the image comprising the reordered MCUs and the rotated image data within the MCUs (94), rotational transcoder 18 re-encodes the MCUs (95). This re-encoding process of step (95) is the opposite of the partial decode process of step (91). Thus, in the example where step (91) involves entropy decoding, step (95) may involve entropy encoding the MCUs. Rotational transcoder 18 then outputs a rotated version of the image data, e.g., a rotated JPEG file, to memory 16 (96).

The techniques described herein may be implemented in hardware, software, firmware or any combination thereof. Any of the described units, modules or components may be implemented together in an integrated logic device or separately as discrete but interoperable logic devices. If implemented in software, the techniques may be realized at least in part by a computer-readable medium comprising instructions that, when executed, performs one or more of the techniques described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates instructions or data structures and that can be accessed, read, and/or executed by a computer.

The instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules, hardware modules, or any combination thereof.

If implemented in hardware or a combination of hardware and software, the techniques described herein may be embodied in an apparatus, device or integrated circuit, which may comprise rotational transcoder 18 shown in FIG. 1, or possibly a combination of components shown in FIG. 1. An integrated circuit, for example, can be configured to perform one or more of the techniques described herein. In that case, an integrated circuit may be configured to reorder MCUs of an encoded image, process the reordered MCUs to rotate image data within the MCUs to generate a rotated version of the encoded image, and output the rotated version of the encoded image.

These and other examples are within the scope of the following claims.

The invention claimed is:

1. A method in an image capture device for rotating an encoded image comprising:
    reordering minimum coded units (MCUs) of the encoded image according to a specified rotation of the encoded image, wherein the MCUs are separately decodable units that are decoded without reference to another MCU;
    applying file size control parameters to image data within the MCUs by reducing or eliminating high frequency components within the MCUs;
    rotating the image data within the MCUs according to the specified rotation comprising performing a flip operation on coefficient values of the MCUs; and
    generating the rotated version of the encoded image comprising the reordered MCUs and the rotated image data within the MCUs, wherein reordering MCUs, rotating image data within the MCUs, and generating a rotated version of the encoded image are accomplished by the image capture device.

2. The method of claim 1, wherein the MCUs comprise blocks of discrete cosine transform (DCT) coefficients coded according to a Joint Photographic Experts Group (JPEG) standard.

3. The method of claim 1, further comprising:
    fetching the encoded image, wherein the encoded image is coded via one or more entropy coding techniques;
    entropy decoding the encoded image to generate the MCUs prior to reordering the MCUs and rotating the image data within the MCUs; and
    entropy encoding the rotated version of the encoded image according to the one or more entropy coding techniques.

4. The method of claim 1, further comprising:
    capturing an image; and
    generating the encoded image based on the captured image.

5. The method of claim 1, wherein processing the MCUs includes:
    applying file size control parameters, wherein the rotated version of the encoded image complies with the file size control parameters.

6. The method of claim 1, wherein reordering the MCUs comprises:
    assigning a restart marker value of 1 to the encoded image;
    indexing the MCUs based on the restart marker value; and
    reordering the MCUs based on the indexing.

7. The method of claim 1, wherein rotating the image data within the MCUs comprises:
    performing a transpose operation on the flipped coefficient values of the MCUs.

8. The method of claim 1, wherein the flip operation comprises a vertical flip operation, and wherein rotating the image data within the MCUs comprises:
    performing a horizontal flip operation on the vertically flipped coefficient values of the MCUs.

9. The method of claim 1, wherein the flip operation comprises a horizontal flip operation and wherein rotating the image data within the MCUs comprises:
    performing a vertical flip operation on the horizontally flipped coefficient values of the MCUs.

10. The method of claim 1, wherein rotating the image data within the MCUs comprises:
    performing a transpose operation on coefficient values of the MCUs; and
    performing the flip operation on the transposed coefficient values of the MCUs.

11. An image capture apparatus comprising:
    memory that stores an encoded image; and
    a rotational transcoder that receives the encoded image from the memory, reorders minimum coded units (MCUs) of the encoded image according to a specified rotation of the encoded image, applies file size control parameters to image data within the MCUs by reducing or eliminating high frequency components within the MCUs; rotates image data within the MCUs according to the specified rotation, performs a flip operation on coefficient values of the MCUs, and generates a rotated version of the encoded image comprising the reordered MCUs and the rotated image data within the MCUs, wherein the MCUs are separately decodable units that are decodable without reference to another MCU, wherein reordering MCUs, rotating image data within the MCUs, and generating a rotated version of the encoded image are accomplished by the image capture apparatus.

12. The apparatus of claim 11, wherein the MCUs comprise blocks of discrete cosine transform (DCT) coefficients coded according to a Joint Photographic Experts Group (JPEG) standard.

13. The apparatus of claim 11, further wherein the rotational transcoder:
fetches the encoded image from the memory, wherein the encoded image is coded via one or more entropy coding techniques;
entropy decodes the encoded image to generate the MCUs prior to reordering the MCUs and rotating the image data within the MCUs; and
entropy encodes the rotated version of the encoded image according to the one or more entropy coding techniques.

14. The apparatus of claim 11, further comprising:
a camera that captures an image; and
an encoder that generates the encoded image based on the captured image.

15. The apparatus of claim 11, wherein the rotational transcoder applies file size control parameters, wherein the rotated version of the encoded image complies with the file size control parameters.

16. The apparatus of claim 11, wherein the rotational transcoder:
assigns a restart marker value of 1 to the encoded image;
indexes the MCUs based on the restart marker value; and
reorders the MCUs based on the indexing.

17. The apparatus of claim 11, wherein the flip operation comprises a vertical flip operation, and the rotational transcoder:
performs a transpose operation on the vertically flipped coefficient values of the MCUs.

18. The apparatus of claim 11, wherein the flip operation comprises a vertical flip operation, and the rotational transcoder:
performs a horizontal flip operation on the vertically flipped coefficient values of the MCUs.

19. The apparatus of claim 11, wherein the flip operation comprises a horizontal flip operation, and the rotational transcoder:
performs a vertical flip operation on the horizontally flipped coefficient values of the MCUs.

20. The apparatus of claim 11, wherein the rotational transcoder:
performs a transpose operation on coefficient values of the MCUs; and
the flip operation comprises a flip operation on the transposed coefficient values of the MCUs.

21. The apparatus of claim 11, wherein the apparatus comprises a wireless handset.

22. The apparatus of claim 11, wherein the apparatus comprises an integrated circuit.

23. A non-transitory computer-readable medium comprising instructions that upon execution cause a processor in an image capture device to:
reorder minimum coded units (MCUs) of an encoded image according to a specified rotation of the encoded image, wherein the MCUs are separately decodable units that are decodable without reference to another MCU;
apply file size control parameters to image data within the MCUs by reducing or eliminating high frequency components within the MCUs;
rotate image data within the MCUs according to the specified rotation by performing a flip operation on coefficient values of the MCUs; and
generate a rotated version of the encoded image comprising the reordered MCUs and the rotated image data within the MCUs, wherein reordering MCUs, rotating image data within the MCUs, and generating a rotated version of the encoded image are accomplished by the image capture device.

24. The computer-readable medium of claim 23, wherein the MCUs comprise blocks of discrete cosine transform (DCT) coefficients coded according to a Joint Photographic Experts Group (JPEG) standard.

25. The computer-readable medium of claim 23, further comprising instructions that cause the processor to:
fetch the encoded image, wherein the encoded image is coded via one or more entropy coding techniques;
entropy decode the encoded image to generate the MCUs prior to reordering the MCUs and rotating the image data within the MCUs; and
entropy encode the rotated version of the encoded image according to the one or more entropy coding techniques.

26. The computer-readable medium of claim 23, further comprising instructions that cause the processor to:
receive a captured image; and
generating the encoded image based on the captured image.

27. The computer-readable medium of claim 23, further comprising instructions that cause the processor to:
apply file size control parameters, wherein the rotated version of the encoded image complies with the file size control parameters.

28. The computer-readable medium of claim 23, further comprising instructions that cause the processor to:
assign a restart marker value of 1 to the encoded image;
index the MCUs based on the restart marker value; and
reorder the MCUs based on the indexing.

29. The computer-readable medium of claim 23, wherein the flip operation comprises a vertical flip operation, the medium further comprising instructions that cause the processor to rotate the image data within the MCUs by performing at least:
a transpose operation on the vertically flipped coefficient values of the MCUs.

30. The computer-readable medium of claim 23, wherein the flip operation comprises a vertical flip operation, the medium further comprising instructions that cause the processor to rotate the image data within the MCUs by performing at least the following operations:
a horizontal flip operation on the vertically flipped coefficient values of the MCUs.

31. The computer-readable medium of claim 23, wherein the flip operation comprises a horizontal flip operation and further comprising instructions that cause the processor to rotate the image data within the MCUs by performing at least the following operations:
a vertical flip operation on the horizontally flipped coefficient values of the MCUs.

32. The computer-readable medium of claim 23, wherein the flip operation comprises a vertical flip operation, the medium further comprising instructions that cause the processor to rotate the image data within the MCUs by performing at least the following operations:
a transpose operation on coefficient values of the MCUs.

33. An image capture device comprising:
means for reordering minimum coded units (MCUs) of an encoded image according to a specified rotation of the encoded image;
means for applying file size control parameters to image data within the MCUs by reducing or eliminating high frequency components within the MCUs;
means for rotating image data within the MCUs according to the specified rotation, the rotating means comprising means for performing a flip operation on coefficient values of the MCUs; and
means for generating a rotated version of the encoded image comprising the reordered MCUs and the rotated image data within the MCUs, wherein the MCUs are separately decodable units that are decodable without reference to another MCU.

34. The device of claim 33, wherein the MCUs comprise blocks of discrete cosine transform (DCT) coefficients coded according to a Joint Photographic Experts Group (JPEG) standard.

35. The device of claim 33, further comprising:
means for fetching the encoded image, wherein the encoded image is coded via one or more entropy coding techniques;
means for entropy decoding the encoded image to generate the MCUs prior to reordering the MCUs and rotating the image data within the MCUs; and
means for entropy encoding the rotated version of the encoded image according to the one or more entropy coding techniques.

36. The device of claim 33, further comprising:
means for capturing an image; and
means for generating the encoded image based on the captured image.

37. The device of claim 33, wherein means for generating includes:
means for applying file size control parameters, wherein the rotated version of the encoded image complies with the file size control parameters.

38. The device of claim 33, wherein means for reordering the MCUs comprises:
means for assigning a restart marker value of 1 to the encoded image;
means for indexing the MCUs based on the restart marker value; and
means for reordering the MCUs based on the indexing.

39. The device of claim 33, wherein the flip operation comprises a vertical flip operation and the means for rotating the image data includes:
means for performing a transpose operation on the vertically flipped coefficient values of the MCUs.

40. The device of claim 33, wherein the flip operation comprises a vertical flip operation and the means for rotating the image data includes:
means for performing a horizontal flip operation on the vertically flipped coefficient values of the MCUs.

41. The device of claim 33, wherein the flip operation comprises a horizontal flip operation and the means for rotating the image data includes:
means for performing a vertical flip operation on the horizontally flipped coefficient values of the MCUs.

42. The device of claim 33, wherein means for rotating the image data includes:
means for performing a transpose operation on coefficient values of the MCUs.

43. The device of claim 33, wherein the means for reordering, the means for rotating, and the means for generating collectively comprise a rotational transcoder.

* * * * *